Sept. 22, 1936.  A. DISTELI  2,055,231
ELECTROOPTICAL TESTING DEVICE FOR TIMEPIECES
Filed Feb. 10, 1933
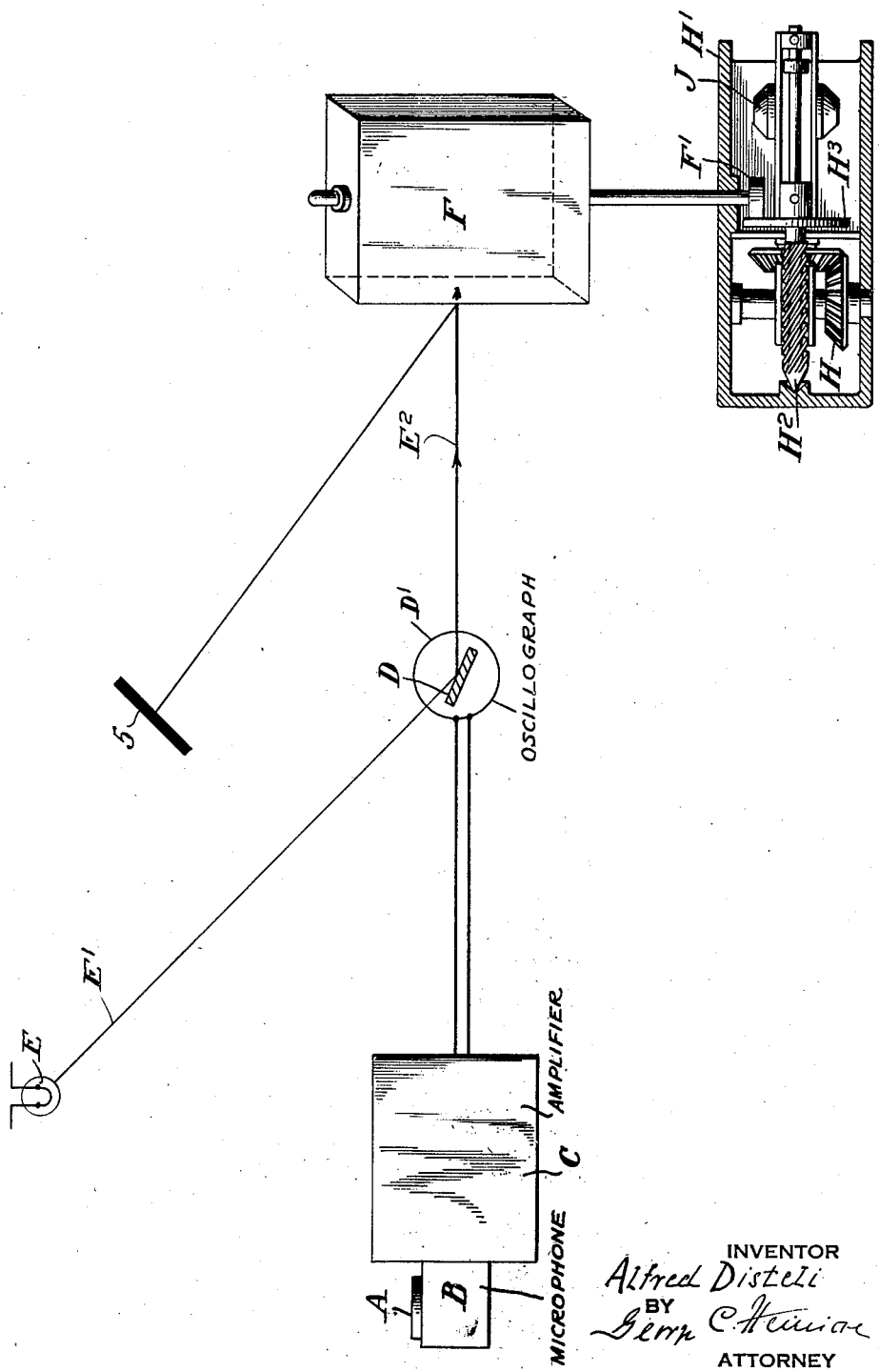

Patented Sept. 22, 1936

2,055,231

UNITED STATES PATENT OFFICE 2,055,231

ELECTROOPTICAL TESTING DEVICE FOR TIMEPIECES

Alfred Disteli, Olten, Switzerland, assignor to Ernst Leitz Optische Werke, G. m. b. H., Wetzlar, Germany Application February 10, 1933, Serial No. 656,102
In Switzerland March 29, 1932

1 Claim. (Cl. 73—51)

This invention relates to improvements in testing devices, particularly to an electro-optical device for testing the working of clock-works or similar escapement controlled works in which the beats of the escapement are microphonically registered and transformed into electrical oscillations in an intensifier which are then used to operate an electric oscillograph for recording the oscillations by optical means by means of a light ray upon a screen. In order to record such short oscillations in their rapid succession, it is necessary to let them appear in their optical reproduction in a multiple repetition on a screen so as to enable a correct observation of the same. For this purpose in many instances rapidly operating revolving mirrors are used which will reproduce or reflect the rays on the screen in multiple.

It is the object of my invention to make use of such a revolving mirror, and to drive the same by means of a regulative drive equipped with an adjustable governor and the drive is so constructed as to keep constant by means of the governor a certain predetermined speed after it has been once adjusted to a speed commensurate to the speed required to the production of a constant and accurate curve on the screen. Thus any deviation of the curves from the constant curve on the screen towards one or the other side during the operation will indicate any irregularities in the working of the clock or other work.

In the accompanying drawing forming a material part of this disclosure:

The single figure is a diagrammatic view of a device constructed according to my invention.

In the arrangement illustrated the ticks of a timepiece such for example as a watch or clock A are transmitted from a microphone B and electrically amplified by an amplifier C. The electric oscillations produced actuate an oscillograph comprising an oscillating mirror D and an excitation coil D¹, a light source E directing a beam E¹ on to the mirror D which deflects the light as shown at E². The beam E² is thus swung to and fro in accordance with the ticks of the timepiece A.

Though the beam E² could be thrown directly on a screen and the resulting path traced by the moving spot of light examined, the oscillation of the beam would in practice be too rapid to permit accurate observation by the naked eye. The beam E² is therefore deflected by a four-faced mirror F rotated about a horizontal axis so that each face in turn throws the beam E² on to a screen G whereby instead of tracing a substantially straight line on the screen the beam traces a curve which can more readily be observed.

The mirror F makes approximately three revolutions for each tick of the timepiece so that for each swing of the mirror D a curve is described on the screen G, these successive curves being superimposed one upon the other.

According to the present invention the rotary mirror F is driven by means which can be adjusted so as to drive the mirror at any desired constant speed. In the construction shown an electric motor (not shown) transmits the drive through gearing H, arranged within a casing H¹, to a shaft H² carrying a friction disc H³ which bears against a disc F¹ carried by the shaft of the mirror F. An adjustable governor J driven by the shaft H² is employed to regulate the speed of the mirror F as by applying a brake to the driven mechanism or by adjusting the field circuit of the driving motor which may be arranged either inside or outside the casing H¹. The governor J, after initial setting, maintains the speed of rotation of the mirror F at a constant value.

The apparatus according to the invention is more especially intended for testing a watch, clock or other time indicator having escapement mechanism, by comparison with a previously regulated standard movement. To this end the standard movement is first placed on or adjacent to the microphone B and the speed of the motor H is adjusted until the curve traced by the light beam on the screen G remains stationary, that is to say so that each successive curve traced on the screen is exactly superposed upon the preceding curve. The speed of the disc F¹ and therefore the rotary mirror F are now maintained constant and the curve obtained from the standard movement is removed and replaced by the timepiece to be tested. If the frequency of the ticks of this timepiece exactly synchronises with that of the standard movement the curve traced by the light beam projected on to the screen G will remain stationary relatively to the curve produced from the standard movement.

If however the frequency of the ticks of the timepiece to be tested is faster or slower than that of the standard movement the resulting curve traced by the light beam on the screen G will move or vary in one direction or the other relatively to the curve produced from the standard movement. The speed of the timepiece to be tested can thus be accurately compared with the standard movement, the curve traced by the light beam clearly indicating whether the timepiece illograph, a micro-
fying the oscilla-
used by the beats
of the time-piece
and its mirror, a   5
s upon said mirror,
ree times about its
ement mechanism
rhich the rays di-
irror are deflected,  10
re representing the
nism of a standard
; deflected by said
reen in a multiple
n said screen, the  15
he standard curve
regularities in the
e tested, and me-
l revolving mirror
revolutions.         20

RED DISTELI.

under test is fast or slow. The timepiece may
then be regulated in the usual manner until the
curve traced on the screen by the light beam re-
mains stationary relatively to the curve produced
from the standard movement.

It will be understood that in addition to pro-
viding means for accurately synchronising or
comparing the frequency of two timepieces the
curve traced by the light beam produced from any
single timepiece will indicate clearly whether or
not the timepiece under test is operating regularly
or otherwise.

It will be understood that I have disclosed the
preferred form of my device only, and that I may
make such changes therein as come within the
scope of the appended claim without departure
from the spirit of my invention and the principles
involved.

Having thus described my invention what I
claim as new and desire to secure by Letters Pat-
ent is:

In an electro-optical testing device for timepieces, including an electro-osc
phone, an intensifier intensi
tions of said microphone ca
of the escapement mechanism
for operating said oscillograph
source of light directing its ray
a revolving mirror revolving th
axis at each beat of the escap
of the time-piece and upon w
rected upon the oscillograph m
and a screen upon which a cur
beats of the escapement mecha
time piece is marked, the rays
revolving mirror upon said sc
repetition to project a curve o
deviation of this curve from t
on the screen indicating any ir
working of the time-piece to b
chanical means to revolve said
and controlling the speed of its

ALF